United States Patent
Mordan

[15] 3,706,904
[45] Dec. 19, 1972

[54] SWEEP HOLD-OFF CIRCUIT
[72] Inventor: William J. Mordan, Colorado Springs, Colo.
[73] Assignee: Hewlett-Packard Company, Palo Alto, Calif.
[22] Filed: June 10, 1970
[21] Appl. No.: 44,983

[52] U.S. Cl. .................... 315/19, 315/18, 315/27 R, 315/28, 315/29
[51] Int. Cl. ................................................ H01j 29/70
[58] Field of Search ............ 315/18, 19, 27 R, 28, 29

[56] References Cited

UNITED STATES PATENTS 2,595,667   5/1952   Gaines ................................... 315/28
2,975,416   3/1961   Mack et al .............................. 315/29
3,249,796   5/1966   Moffitt .................................... 315/29

*Primary Examiner*—Benjamin A. Borchelt
*Assistant Examiner*—S. C. Buczinski
*Attorney*—A. C. Smith

[57] ABSTRACT

A circuit for use with an oscilloscope sweep circuit includes an integrator for producing a control signal that establishes a substantially fixed hold-off time between the arming and triggering of the sweep as a function of the deviation from a reference value of the time between the arming and triggering of the sweep circuit.

4 Claims, 2 Drawing Figures

INVENTOR
WILLIAM J. MORDAN
BY  A.C. Smith
ATTORNEY

SWEEP HOLD-OFF CIRCUIT

BACKGROUND OF THE INVENTION

Certain known oscilloscope sweep circuits include a hold-off circuit which operates at the end of a sweep cycle to prevent the sweep from being triggered again until the circuits have recovered completely. However, triggering of the sweep circuit may occur at high frequency triggering rates while the hold-off circuit is in a transitional condition between operating states. This may initiate another sweep cycle at a random time during a recurrence of a signal waveform which will produce undesirable multiple displays or jittering displays of the high frequency signals.

SUMMARY OF THE INVENTION

The hold-off circuit of the present invention prevents multiple triggering of a sweep circuit even within such narrow time periods as a few tenths of nanoseconds typically required for transitional conditions in a sweep circuit to settle down. The present hold-off circuit responds to a reference pulse of known width and to a pulse having a width which is proportional to the time interval between the arming and triggering of a sweep circuit to produce a representative control signal. This control signal is then used to maintain a preselected time interval between arming and triggering of a sweep circuit.

DESCRIPTION OF THE PREFERRED EMBODIMENT

Figure 1:
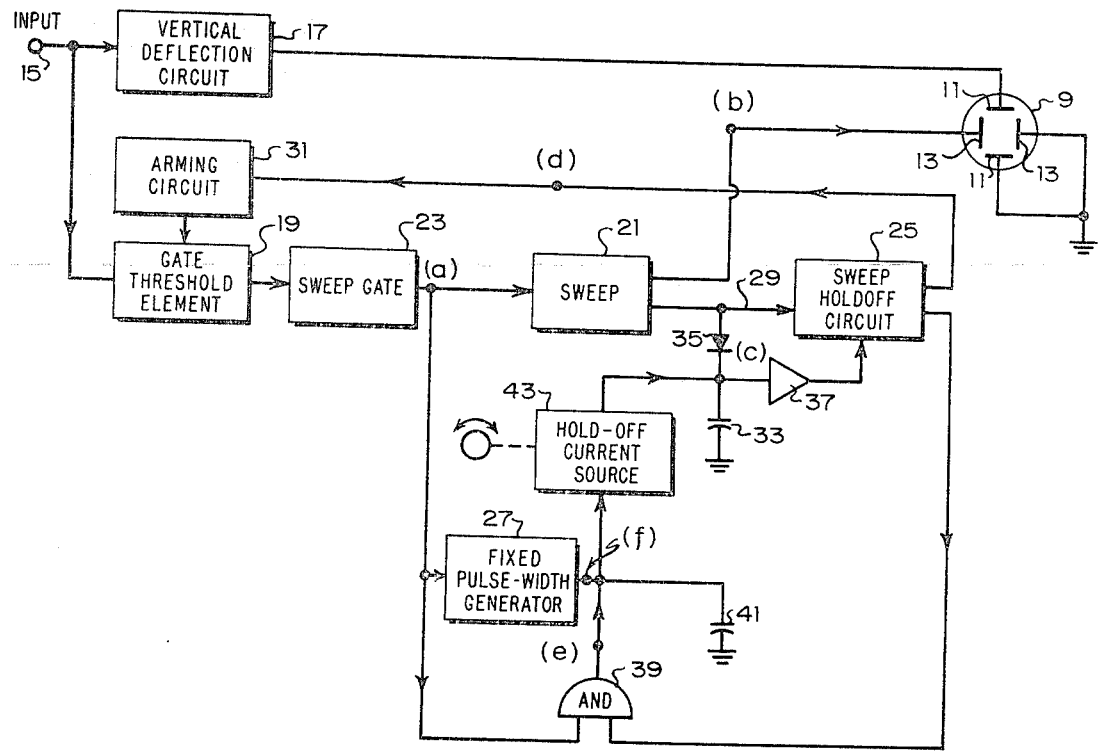
FIG. 1 is a schematic diagram of the circuit of the present invention.

FIG. 1 of the drawing shows the hold-off circuit of the present invention operatively arranged to control the rate at which the main sweep of an oscilloscope can be retriggered. The oscilloscope includes a cathode ray display tube 9 having a set of vertical deflection plates 11 and a set of horizontal deflection plates 13. An input signal 15 to be displayed is amplified (17) and is applied to the vertical deflection plate 11. Also, the input signal 15 is applied to the gate threshold element 19 (typically, a tunnel diode in a circuit such as described in U.S. Pat. application Ser. No. 814,586 entitled TRIGGER CIRCUIT filed on Apr. 9, 1969, by Richard H. McMorrow, Jr.). This gate threshold element supplies sweep circuit triggering pulses through a sweep gate 23 for controlling the main sweep 21. The sweep signal from the main sweep 21 is applied to the horizontal deflection plates 13 of the cathode ray display tube 9. When the sweep 21 is initiated in synchronism with the starts of recurrences of the input signal 15, the resulting display of the input signal is repetitively displayed in real time on the cathode ray display tube 9 in the conventional manner which tends to establish the displayed waveform in fixed horizontal position. However, when the sweep is initiated at times which vary with respect to the starts of recurrences of the input signal, the displayed waveform tends to jitter or appear as multiple, phase-separated images on the display tube 9.

Figure 2:
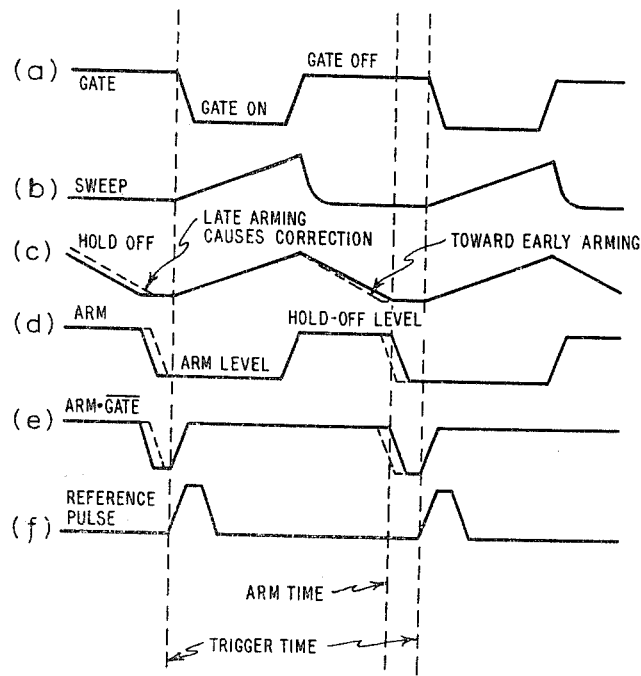
FIG. 2 is a graph showing waveforms of the present circuit in operation.

In accordance with the present invention, the sweep 21 is prevented from being retriggered for a controllable time after the end of a previous sweep signal (FIG. 2b) to insure that the gate threshold element 19 may be properly armed and then properly triggered in synchronism with the start of another recurrence of the input signal. This is accomplished by varying the hold-off time after the preceding sweep (FIG. 2c) in accordance with the difference between a reference time interval and the time interval between the arming and triggering of the sweep 21. Late arming in one sweep cycle thus causes correction to early arming in a subsequent sweep cycle as shown in FIGS. 2c and 2d. Each time the sweep gate 23 is enabled by a trigger pulse from the threshold element 19, the main sweep 21 applies a sweep voltage to the horizontal deflection plates 13 of the display tube 9, as shown in FIG. 2b, and also triggers the generator 27 to produce a reference pulse of predetermined pulse width, as shown in FIG. 2f. The sweep voltage applied to the horizontal deflection plates 13 increases in amplitude substantially linearly with time and facilitates the display of the waveform of signal appearing at the input 15. At the end of the sweep, the sweep hold-off circuit 25 is triggered (FIG. 2d) by the end-of-sweep signal appearing at an output 29 of the sweep circuit 21 and this, in turn, controls the arming circuit 31 to preclude the gate threshold element 19 from being retriggered on the next recurrence of signal at the input 15. The duration of the sweep hold-off determined by circuit 25 is controlled by the capacitor timing circuit including capacitor 33, diode 35 and the amplifier 37. This circuit supplies a preselected amount of charge to the capacitor 33 which is depleted with time by the current source 43 to a level that causes the sweep hold-off circuit 25 to trigger to its alternate operating state. The time of operation of the sweep hold-off circuit 25 in the operating state which controls the arming circuit 31 to prevent retriggering is thus determined by the discharge rate of capacitor 33 and by the amount of charge initially supplied to the capacitor 33. In accordance with the present invention, this discharge rate is altered in accordance with the variation between the period of the pulses from generator 27 and the period between arming and retriggering as determined by the signals applied to AND gate 39. The AND gate 39 is thus enabled only during the period of time when the sweep gate 23 is enabled and the sweep hold-off circuit 25 is not controlling the arming circuit 31, as shown in FIG. 3e. The pulse from AND gate 39 per sweep cycle (FIG. 2e) is arranged to have a polarity which is opposite to the pulse from generator 27 per sweep cycle, and these two signals are combined to supply a variable amount of charge to capacitor 41. The voltage across capacitor 41 is thus proportional to the difference between the period of the reference pulses from generator 27 and the period of the pulse from AND gate 39, which voltage then varies with variations in the time interval between arming and retriggering. The voltage across capacitor 41 is applied to a manually controllable hold-off current source 43 (which, for example, may include a field-effect transistor source follower circuit) for controlling the rate of flow of discharge current from capacitor in proportion to the voltage across capacitor 41. Late arming, as shown in FIGS. 2c and 2d, produces a short pulse from AND gate 39 (FIG. 2e) which increases the hold-off discharge rate, thereby providing earlier arming in the next cycle. In this way, the discharge period for voltage across capacitor 33 (FIG. 2c) is altered in accordance with the time interval between arming and retriggering of the gate threshold element 19. The hold-off period determined by circuit 25 (FIG. 2d) is thus reduced in response to the time interval between arming and retriggering decreasing below the period of the reference pulses from generator 27. In this way, the gate threshold element 19 is precluded from retriggering after the termination of a previous sweep cycle before sufficient time has elapsed for the circuits to settle down from their transitional condition of being armed sooner than the expected recurrence of the input signal. Triggering of the sweep 21 upon recurrences of the input signal is thus assured to occur only at times for which the gate threshold element 19 is properly restored to its triggerable condition.

I claim:

1. In a cathode-ray oscilloscope having signal display means including horizontal and vertical deflection systems, a sweep circuit for the horizontal deflection system comprising:
   a sweep generator connected to the horizontal deflection system for applying sweep signal thereto in response to a sweep initiating signal applied thereto;
   sweep triggering means having an arming input and an applied signal input and being operable in first and second operating states, said sweep triggering means being connected to apply sweep initiating signal to said sweep generator upon transition from the first operating state to the second operating state in response to an applied signal and being disposed to be reset to the first operating state in response to an arming signal applied thereto;
   sweep hold-off means responsive to termination of sweep signal from said sweep generator for applying arming signal to said sweep triggering means for a hold-off period after said termination that is related to a control signal applied thereto;
   reference generating means producing a reference signal representative of a preselected sweep hold-off period;
   first means responsive to the time interval between resetting of said sweep triggering means and the transition thereof from the first to the second operating states in response to applied signal for producing a variable signal representative of said time interval; and
   second means connected to receive said reference and variable signals for applying control signal to said sweep hold-off means to alter said hold-off period with respect to said preselected sweep hold-off period.

2. A sweep circuit as in claim 1 wherein said second means includes capacitive storage means connected to store a selected quantity of charge per sweep signal, and a discharge circuit for discharging the stored charge in the capacitive storage means at a controllable rate, in response to said variable signal.

3. A sweep circuit as in claim 1 wherein:
   said reference generating means responds to each sweep initiating signal to produce a reference pulse having a predetermined pulse width;
   said first means responsive to the time interval includes gating means connected to receive said sweep initiating signal and a signal representative of no arming signal applied to said sweep triggering means for producing said variable signal; and
   said second means applies to said sweep hold-off means the control signal which is indicative of the combination of said reference pulses and said variable signal.

4. A sweep circuit as in claim 3 wherein said second means includes first and second capacitive storage means, the first capacitive storage means being connected to apply to said sweep hold-off means the control signal which is representative of the amount of charge stored by said first capacitive storage means;
   third means connected to said first capacitive storage means for supplying a selected amount of charge thereto per sweep signal;
   a controllable current source connected to said first capacitive storage means for discharging the charge stored thereby at a rate controlled by a hold-off control signal applied thereto; and
   fourth means including said second capacitive storage means connected to receive said reference pulses and said variable signal for applying to said current source a hold-off control signal indicative of the time relationship between said reference pulses and said variable signal.

* * * * *